Dec. 10, 1940.   A. STOLL   2,224,659
METHOD OF MAKING SELF-LOCKING SCREW THREADED ELEMENTS
Filed April 12, 1940   2 Sheets—Sheet 1
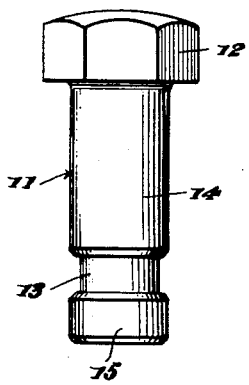
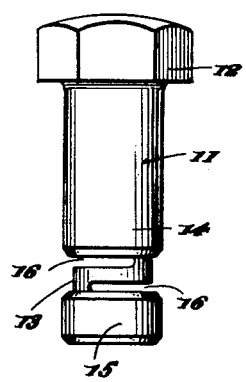
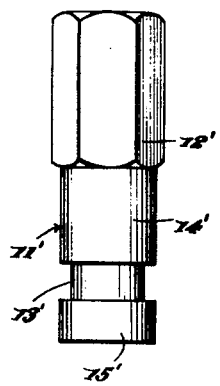
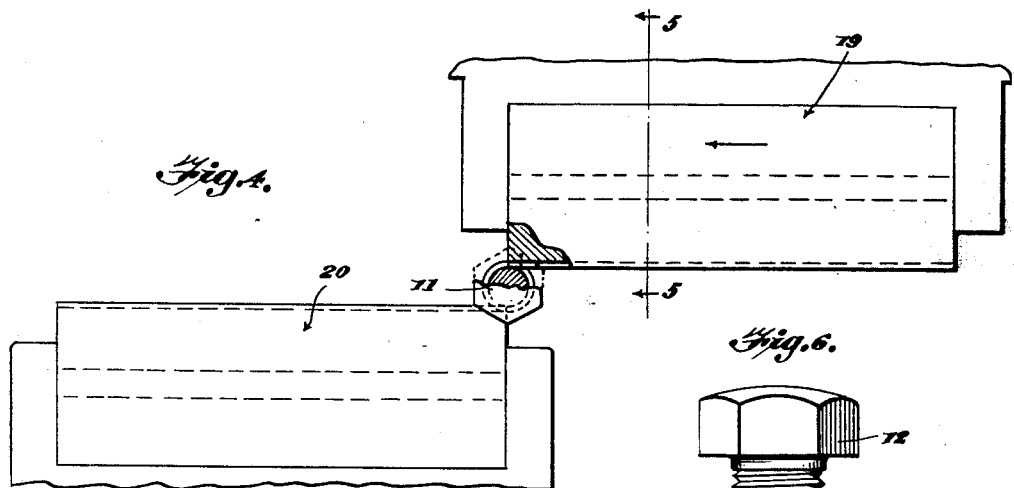
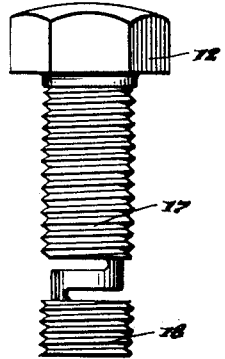
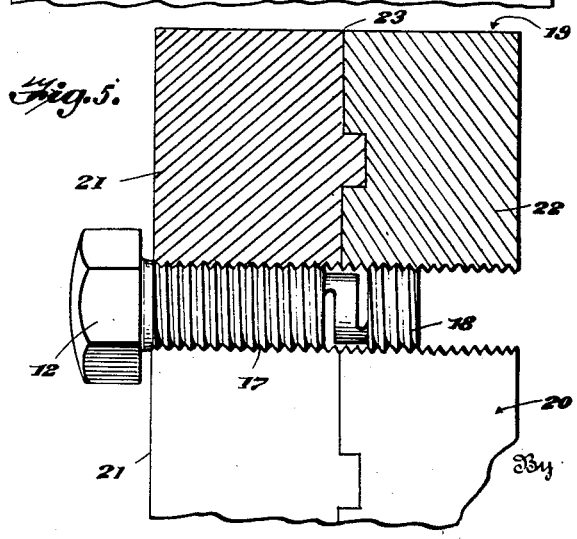
Inventor
ALBERT STOLL Dec. 10, 1940.   A. STOLL   2,224,659
METHOD OF MAKING SELF-LOCKING SCREW THREADED ELEMENTS
Filed April 12, 1940   2 Sheets-Sheet 2
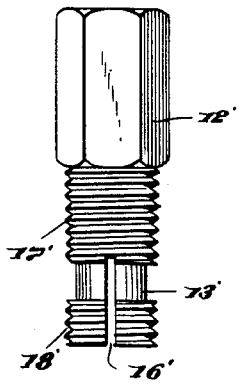
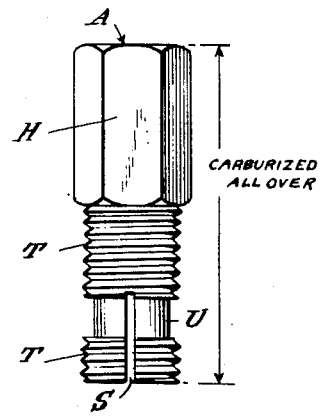
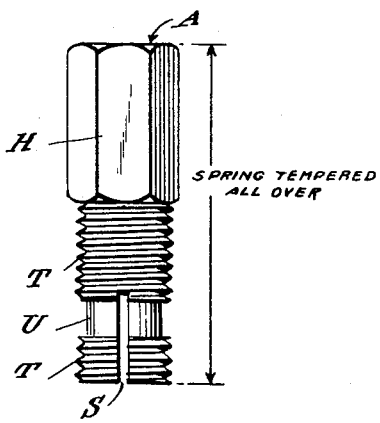
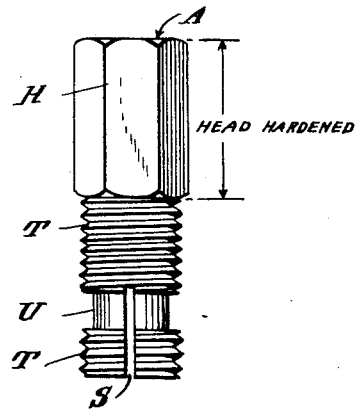
Inventor
ALBERT STOLL
Attorney Patented Dec. 10, 1940

2,224,659

UNITED STATES PATENT OFFICE 2,224,659

METHOD OF MAKING SELF-LOCKING SCREW THREADED ELEMENTS

Albert Stoll, Detroit, Mich., assignor to Clare L. Brackett, Detroit, Mich.

Application April 12, 1940, Serial No. 329,364

41 Claims. (Cl. 10—10)

This invention relates to the manufacture of screw threaded fastening elements, particularly those of the self-locking type, and this application is a continuation as to all common subject matter of my prior co-pending applications Serial No. 114,259, filed December 4, 1936, Serial No. 122,629, filed January 27, 1937, and Serial No. 218,194, filed July 8, 1938.

In particular the present application deals with the production of self-locking screw threaded elements of the mismatched helix type, wherein the shank or stem is provided with axially spaced, integrally united portions having threaded surfaces on which the thread helices of the respective portions are mismatched; that is, axially offset or staggered. When such an element is engaged in the threaded bore of a receiving member, the shank is subjected to a resultant tension which serves effectively to lock the element against accidental displacement.

The production of such elements in an economic manner commercially involves a number of problems: the shank of each element must be screw threaded in exact conformity with each of its fellows; the element must be formed from a malleable metal stock capable of easy and rapid fabrication; the finished product must possess inherent resiliency in that portion of the shank which integrally connects the spaced threaded portions in order that the connecting portion, at least, shall be placed under spring tension when the mismatched threaded portions are engaged in a threaded receiving bore; and the finished products must be able to meet all requirements of service.

An object of the invention is to provide a method of producing a self-locking screw threaded element having a shank provided with spaced threaded portions integrally connected by a resilient portion, with the thread helices of the respective threaded portions being mismatched.

Another object is to provide a method of producing a self-locking screw threaded element having a high hardness head and a surface hardened shank provided with spaced threaded portions integrally connected by a resilient, spring tempered portion, with the threaded helices of the respective threaded portions being mismatched.

Still another object is to provide a method of treating a headed and screw threaded fastening element having its thread helices mismatched at spaced portions of the shank which are integrally united by intervening unthreaded connecting portions, whereby to spring temper the connecting portions, surface harden the threaded portions, and highly harden the surface of the head.

Other objects will be apparent from the description.

In the accompanying drawings:

Figure 1 is an elevation of the screw blank following the formation of the head and the undercut connecting portion.

Figure 2 is an elevation of the blank after the undercut connecting portion has been slotted.

Figure 3 is an elevation of an alternative form of blank following the formation of the head and the undercut connecting portion.

Figure 4 is an elevation, partly sectional, illustrating an apparatus and method of thread forming the blanks.

Figure 5 is a section on the line 5—5 of Figure 4.

Figure 6 is an elevation of the blank shown in Figure 1, following the processing steps of undercutting, thread forming and slotting.

Figure 7 is an elevation of the blank of Figure 3, following the processing steps of undercutting, thread forming and slotting.

Figure 8 is an elevation of a mechanically finished element, diagrammatically illustrating the first stage of a metallurgical processing.

Figure 9 is a similar elevation illustrating the second stage of metallurgical processing.

Figure 10 is likewise a similar elevation, and illustrates a final step of the metallurgical processing.

In the practice of the invention it is preferred to use a blank of low carbon high manganese steel wire stock which is processed to produce the finished article.

The processing, with the form of blank shown in Figure 1, comprises upsetting the blank 11 at one end to provide the head 12, and undercutting the shank so to provide a cylindrically reduced portion 13 which integrally connects the resulting axially spaced thread receiving portions 14 and 15. The reduced connecting portion is then slotted to provide criss-cross slots 16 which extend inwardly in parallel spaced relation from opposite sides of the blank to a point past its center, as shown in Figure 2. The slotting of the blank renders the connecting portion resilient.

After slotting, the thread portions 14 and 15 are screw threaded by suitable means to provide the threads 17 and 18, so formed that they are helically mismatched although of equal pitch. The threads 18 on the leading end portion 15 are offset axially from the threads 17 on the portion 14. When a screw of this character is inserted in an evenly threaded socket, the resilient portion 13 is placed under tension which effectively serves to lock the screw in position.

A preferred manner of forming the threads is by die rolling, as shown in Figures 4 and 5. The blank is placed between rolling dies 19 and 20 each of which consists of two parts 21 and 22 forming a compound die divided along a joint line 23 extending longitudinally thereof, and the threads are rolled simultaneously on the axially spaced portions in a single thread forming operation.

In order to procure the desired mismatching of the thread helices on the screw the thread forming serrations of the die part 21 are offset or staggered with relation to those of the die part 22, the blank is placed between the dies so that the undercut connecting portion 13 registers with the die part joint 23, as shown in Figure 5.

In processing the form of blank shown in Figure 3 the wire stock constituting the blank 11' is formed at one end with the head 12' and the shank is undercut to provide the cylindrically reduced portion 13' which integrally connects the resulting axially spaced thread receiving portions 14' and 15'. The blank is then threaded, preferably by rolling between the dies 19 and 20 in the manner previously described, and the connecting portion 13 is made resilient by slotting the shank inwardly and axially from its leading end as at 16' after the threads 17' and 18' are formed, the slot 16' bifurcating the shank inwardly beyond its reduced portion.

Figures 8, 9 and 10, diagrammatically illustrate the steps of a metallurgical treatment employed when the steel stock is so soft as to render the screw unfit for service, as would be a low carbon steel. Although the screw shown is that of Figure 7, the metallurgical processing is the same for all embodiments of screw structure, and in the interest of brevity a single description applicable to both forms is given. The screw is generally indicated by reference character A, the head by character H, the undercut resilient connecting portion by U, the threads by T, and the slotting by S.

The entire screw is carburized to a depth of case sufficient to carburize the entire thickness or body of the reduced connecting portion U, or one-half its thickness prior to slotting, and the screw is suitably heat treated to impart the requisite spring temper to the portion U. The head is then hardened and the entire processing is complete.

The first step in the metallurgical processing of the screw A is that of carburization. Carburization is carried out over its entire surface at a temperature ranging between 1650° to 1700° F., to a depth of case sufficient to carburize the entire thickness of the body of the reduced connecting portion U. The presence of the slot S promotes carburization. After complete surface carburization, as shown in Figure 8, the article is quenched in oil.

The next step is indicated in Figure 9, and consists in spring tempering to make the portion U properly resilient. To accomplish this the screw is drawn in a tempering furnace at approximately 900° F., for approximately one hour, and is then quenched in oil. In this stage the entire carburized depth of the material is brought to spring temper, and as such depth is substantially the full thickness of the slotted portion U the entire body of that portion will be made resilient.

The spring tempering reduces the hardness of the case, and while the screw is in a condition of reduced hardness it is preferable to grind the head H smooth and true with respect to the axis of the shank. Grinding at this stage eliminates possibility of surface cracking. In a screw which is high in carbon and which is highly hardened, cracks develop in the surface being ground, whereas at the reduced hardness of the spring tempering range such cracks do not develop from grinding.

Figure 10 illustrates the final stage of treatment. In this stage the head H only is highly hardened by being brought up to a temperature ranging between 1450° to 1500° F., and then quenched in water. During this selective hardening of the head the body of the shank is appropriately protected from the high heat so that the spring temper of the shank remains unaffected thereby.

After the water quench from the head hardening operation, the entire screw is given a strain draw for approximately thirty minutes at 375° F., which removes the strains resulting from the hardening treatment and without substantially reducing the hardness.

The metallurgical treatment as stated results in a final product having a spring tempered body in which the reduced connecting shank portion is resilient, and in which the head has a high hardness with a minimum reading of 58 Rockwell "c."

A preferred stock metal consists of a low carbon high manganese steel, a typical example of which has the following analysis:

| | |
|---|---|
| Carbon | .15– .25 |
| Manganese | .70–1.00 |
| Phosphorus | .045 |
| Sulphur | .055 |

The steel is of fine grain size 6 to 8 and is normal. It is easily upset and readily capable of fabrication to a desired form. Its nature permits the formation of threads by suitable thread rolling dies, and its character is such that it is peculiarly fitted for hardening and tempering.

I claim:

1. The method of forming a self-locking screw which comprises providing a screw blank, undercutting the blank at a point between its ends, placing the blank between two-part dies having offset thread forming serrations on the faces of the die parts, aligning the undercut portion of the blank with the abutting surfaces of the die parts, and operating the dies to roll a thread on the screw blank.

2. The method of forming offset threads on a screw blank having an undercut portion between its ends, which comprises providing two-part dies having thread forming serrations, the serrations of the die parts being offset, and rolling the screw blank between the two-part dies with the undercut portion of the blank arranged in line with the abutting surfaces of the die parts.

3. The method of forming a self-locking screw which comprises producing a screw blank, undercutting the blank at a point between its ends, slotting the undercut portion of the blank to render it resilient, placing the blank between two-part dies having offset thread forming serrations on the faces of the die parts, aligning the undercut portion of the blank with the abutting surfaces of the die parts, and operating the dies to roll a thread on the screw blank.

4. The method of forming offset threads on a screw blank having an undercut portion between its ends, which comprises providing two-part dies having thread forming serrations, the serrations of the die parts being offset with respect to each other, slotting the undercut portion of the screw blank to render it resilient, and rolling the screw blank between the two-part dies with the undercut portion of the blank arranged in line with the abutting surfaces of the die parts.

5. The method of forming a self-locking screw which comprises providing a screw blank, undercutting the blank at a point between its ends, and simultaneously rolling axially offset screw threads on the portions of the blank separated by the undercut portion thereof.

6. The method of forming a self-locking screw which comprises undercutting the screw blank at a point between its ends, slotting the undercut portion of the blank to render it resilient, and simultaneously rolling axially offset screw threads of equal pitch on the portions of the blank separated by the undercut portion thereof.

7. The method of forming a self-locking screw which comprises undercutting the screw blank at a point between its ends, and simultaneously rolling axially offset screw threads on the portions of the blank separated by the undercut portion in compound dies the dividing lines of which coincide with the undercut portion during the thread rolling operation.

8. The method of forming a self-locking screw which comprises undercutting the screw blank at a point between its ends, slotting the undercut portion of the blank to render it resilient, and simultaneously rolling axially offset screw threads of equal pitch on the portions of the blank separated by the undercut portion thereof between compound dies the dividing lines of which coincide with the undercut portion during the thread rolling operation.

9. The method of forming a self-locking screw which comprises providing a screw blank and simultaneously rolling axially offset screw threads of the same pitch on spaced portions of the blank.

10. The method of forming a self-locking screw which comprises providing a screw blank, and rolling axially offset screw threads of the same pitch on spaced portions of the blank in a single thread rolling operation.

11. The method of forming a self-locking screw which comprises providing a screw blank, and forming axially offset threads of the same pitch on spaced portions of the blank in a single thread forming operation.

12. The method of forming a self-locking screw which comprises providing a blank having a shank with axially spaced portions integrally connected by a reduced shank portion, placing the blank between thread rolling dies having relatively offset thread forming serrations of the same pitch, and operating the dies to roll axially offset screw threads on the spaced blank portions.

13. The method of forming a self-locking screw which comprises providing a blank having a shank, and rolling screw threads of the same pitch on axially spaced portions of the shank, with the lead of the thread on one of said threaded portions axially offset from the lead of the thread on the other portion, all of the screw threads on the respective portions being rolled simultaneously.

14. The method of forming a self-locking screw which comprises providing a blank having a shank, circumferentially reducing the shank intermediate its ends, and rolling screw threads of the same pitch on the non-reduced portions of the shank, with the lead of the thread on one of the portions axially offset from the lead of the thread on the other portion, all of the screw threads on the respective portions being rolled simultaneously.

15. The method of forming a self-locking screw threaded element which comprises providing a blank, simultaneously rolling axially offset screw threads on spaced portions thereof, and bifurcating the threaded portions inwardly from one end of the blank.

16. The method of forming a self-locking screw threaded element which comprises providing a blank, circumferentially reducing the same intermediate its ends, rolling axially offset screw threads simultaneously on the portions of the blank separated by the reduced portion, and slotting the threaded blank axially through the reduced portion to render it resilient.

17. The method of forming a self-locking screw threaded element which comprises providing a blank, circumferentially reducing the same intermediate its ends, rolling axially offset screw threads on the non-reduced portions of the blank, and axially slotting one of the threaded portions to render it resilient.

18. The method of producing a self-locking screw threaded element, which comprises forming a blank of low carbon high manganese steel as a headed shank with a plurality of spaced helically mismatched threaded portions integrally united by a reduced slotted connecting portion, carburizing the entire surface to harden it, spring tempering the carburized blank to render the connecting portion resilient, and thereafter additionally hardening the head only.

19. The method of producing a self-locking screw threaded element, which comprises forming a blank of low carbon high manganese steel as a headed shank with a plurality of spaced helically mismatched threaded portions connected by a reduced slotted portion, carburizing the blank over its entire surface to a depth sufficient to carburize the entire body of the reduced connecting portion, spring tempering the blank to make the connecting portion resilient, and thereafter highly hardening the head only.

20. The method of producing a self-locking screw threaded element, which comprises forming a blank of low carbon high manganese steel as a headed shank with a plurality of spaced helically mismatched threaded portions connected by a reduced slotted portion, carburizing the blank over its entirety to a depth sufficient to carburize the entire body of the reduced portion and at a temperature between 1650° and 1700° F., quenching the blank in oil, then drawing the blank for approximately one hour at 900° F. to spring temper the carburized blank and again quenching in oil, and thereafter subjecting the head only to a high hardening heat treatment at a temperature between 1450° to 1500° F. and quenching in water.

21. The method of producing a self-locking screw threaded element, which comprises forming a blank of low carbon high manganese steel as a headed shank with a plurality of spaced helically mismatched threaded portions connected by a slotted reduced portion, carburizing the blank over its entirety to a depth sufficient to carburize substantially the entire thickness of the reduced portion, subjecting the carburized blank to a tempering heat of approximately 900° F. to make the reduced portion resilient, 22. The method of producing a self-locking screw threaded element, which comprises forming a blank of low carbon high manganese steel as a headed shank with a plurality of spaced heically mismatched threaded portions connected by a reduced slotted portion, carburizing the entire blank to a depth sufficient to carburize substantially the entire thickness of the reduced portion, spring tempering the entire blank whereby to render the reduced portion resilient, then subjecting the head only to a high hardening heat treatment without affecting the spring temper of the shank, and thereafter drawing the element at a temperature of approximately 375° F., for a period of substantially thirty minutes.

23. The method of producing a self-locking screw threaded element, which comprises forming a soft steel blank as a headed shank with a plurality of spaced mismatched threaded portions united by an integral reduced slotted portion, carburizing and case hardening the entire surface of the blank, then reducing the hardness by heat tempering to spring temper the reduced portion, and thereafter increasing to a high degree of hardness the head only without affecting the spring temper of the shank.

24. The method of producing a self-locking screw threaded element, which comprises forming a soft steel blank as a headed shank with a plurality of spaced mismatched threaded portions integrally connected by a slotted reduced portion, carburizing and hardening the entire surface of the blank, and heat tempering the shank to render the reduced portion resilient.

25. A process of treating a low carbon steel screw threaded element having a shank threaded in mismatched relation at a plurality of points spaced by a reduced slotted connecting portion, whereby to render it self-locking, which comprises increasing the carbon content over the entire surface of the element to a depth substantially equal to the thickness of the reduced portion, and spring tempering the element to make the reduced portion resilient.

26. A process of treating a low carbon steel screw threaded element having a headed shank threaded in mismatched relation at a plurality of points spaced by a reduced slotted connecting portion, whereby to render it self-locking and of requisite hardness, which comprises increasing the carbon content over the entire surface and hardening the same, reducing the hardness and spring tempering the element whereby to render the reduced portion resilient, and then rehardening the head only without affecting the temper of the remainder.

27. The method of forming a self-locking screw threaded element, which comprises providing a blank, reducing the blank between its ends, screw threading in relatively mismatched relation the portions of the blank spaced by said reduced portion, carburizing the entire blank so formed, and heat treating the carburized blank to spring temper whereby to make the reduced portion resilient.

28. The method of forming a self-locking screw threaded element, which comprises providing a blank having a shank with axially spaced portions integrally connected by a reduced shank portion, forming threads on the spaced blank portions in relatively offset relation, and treating the threaded blank to spring temper the reduced connecting portion.

29. The method of producing a self-locking screw threaded element, which comprises forming a blank of low carbon high manganese fine grain steel as a headed shank with a plurality of spaced helically mismatched threaded portions connected by a reduced slotted portion, carburizing the blank over its entire surface to a depth sufficient to carburize the entire body of the reduced connecting portion, spring tempering the blank to make the connecting portion resilient, and thereafter highly hardening the head only.

30. The method of forming a self-locking screw, which comprises providing a screw blank, undercutting the blank at a point between its ends, rolling axially offset screw threads on the portions of the blank separated by the undercut portions thereof, and carburizing and heat treating the screw.

31. The method of forming a self-locking screw, which comprises undercutting the screw blank at a point between its ends, slotting the undercut portion of the blank, forming axially offset screw threads of equal pitch on the portions of the blank separated by the undercut portion thereof, and carburizing and heat treating the screw to impart resiliency to the slotted undercut portion thereof.

32. The method of forming a self-locking screw, which comprises providing a screw blank of low carbon steel, undercutting the blank at a point between its ends, slotting the undercut portion of the blank, forming axially offset threads on the portions of the blank separated by the undercut portion thereof, carburizing the screw to a depth substantially one-half the width of the unslotted undercut portion, and heat treating the screw to impart resiliency to the undercut portion of the screw.

33. The method of treating a blank in the manufacture of a self-locking screw, which comprises providing a screw blank of low carbon steel, undercutting the blank at a point between its ends, slotting the undercut portion of the blank, carburizing the blank to a depth substantially one-half the width of the unslotted undercut portion, and heat treating the blank to impart resiliency to the undercut portion of the blank.

34. The method of forming a self-locking screw threaded element, which comprises providing a blank, reducing the blank intermediate its ends, simultaneously rolling axially offset screw threads on the non-reduced portions, and processing the threaded blank to provide spring temper throughout the reduced portion.

35. The method of forming a self-locking screw threaded element, which comprises providing and heading a screw blank, circumferentially reducing the same at a point between its ends, rolling axially offset screw threads on the portions of the blank separated by the reduced portion, carburizing the entire blank, and heat treating the same in a manner to harden the head and spring temper the remainder.

36. The method of forming a self-locking screw threaded element, which comprises providing a blank, rolling axially offset screw threads on spaced portions thereof, axially slotting the blank inwardly from its threaded end, and then spring tempering the threaded body of the blank.

37. The method of forming a self-locking screw threaded element, which comprises providing a headed blank, reducing its shank intermediate the ends, forming axially offset screw threads on the non-reduced portions of the shank, bifurcating the shank inwardly from the threaded end beyond its reduced portion, and spring tempering the shank.

38. The method of forming a self-locking screw threaded element, which comprises providing a blank, circumferentially reducing the same in a zone between its ends, rolling axially offset screw threads on the portions of the blank separated by the reduced portion, axially slotting the threaded blank inwardly from one end and through the reduced portion, and spring tempering the threaded blank over the extent of its threaded and reduced portions.

39. The method of forming a self-locking screw threaded element, which comprises providing a screw blank, heading the same, circumferentially reducing a portion of the blank between its ends, forming axially offset screw threads on the portions of the blank separated by the reduced portion, axially slotting the threaded blank inwardly from its threaded end and through the reduced portion, carburizing the entire blank, and thereafter treating the same to harden the head and spring temper the blank over the entire extent of the axial slot.

40. The method of producing a screw-threaded element, which comprises forming a blank of low carbon steel as a headed shank, screw-threading the shank, axially slotting the shank inwardly from its threaded end and for a portion of its length, carburizing the blank over its entire surface to a depth sufficient to carburize substantially the entire body of the slotted portion thereof, and spring tempering the blank to render the slotted portion resilient.

41. The method of producing a screw-threaded element, which comprises forming a blank of low carbon high manganese steel as a headed shank, screw-threading the shank, axially slotting the shank inwardly from its threaded end and for a portion of its length, carburizing the blank over its entire surface to a depth sufficient to carburize substantially the entire body of the slotted portion thereof, spring tempering the blank to render the slotted portion resilient, and thereafter highly hardening the head only.

ALBERT STOLL.